(12) United States Patent
Martikainen (10) Patent No.: US 9,710,299 B2
(45) Date of Patent: Jul. 18, 2017

(54) METHOD AND A COMPUTER PROGRAM PRODUCT FOR CONTROLLING THE EXECUTION OF AT LEAST ONE APPLICATION ON OR FOR A MOBILE ELECTRONIC DEVICE, AND A COMPUTER

(71) Applicant: KONSULTOINTI MARTIKAINEN OY, Helsinki (FI)

(72) Inventor: Olli Martikainen, Helsinki (FI)

(73) Assignee: KONSULTOINTI MARTIKAINEN OY, Helsinki (FI)

( * ) Notice: Subject to any disclaimer, the term of this patent is extended or adjusted under 35 U.S.C. 154(b) by 214 days.

(21) Appl. No.: 14/342,142

(22) PCT Filed: Sep. 20, 2012

(86) PCT No.: PCT/EP2012/068583
§ 371 (c)(1),
(2) Date: Feb. 28, 2014

(87) PCT Pub. No.: WO2013/041648
PCT Pub. Date: Mar. 28, 2013

(65) Prior Publication Data
US 2014/0215469 A1   Jul. 31, 2014

(30) Foreign Application Priority Data
Sep. 20, 2011 (EP) .................................. 11182075

(51) Int. Cl.
*H04B 5/00* (2006.01)
*G06F 9/48* (2006.01)
(Continued)

(52) U.S. Cl.
CPC ............ *G06F 9/48* (2013.01); *G06F 9/44505* (2013.01); *H04W 4/04* (2013.01)

(58) Field of Classification Search
CPC ......... G06F 9/44505; G06F 9/48; H04W 4/04
(Continued)

(56) References Cited

U.S. PATENT DOCUMENTS 6,198,779 B1 * 3/2001 Taubenheim ............ H04B 1/28
375/286
2006/0128311 A1 * 6/2006 Tesfai ................... G01S 5/0252
455/67.11
(Continued)

FOREIGN PATENT DOCUMENTS

WO    WO-2004/040923 A1    5/2004
WO    WO-2013/041648 A1    3/2013

OTHER PUBLICATIONS

Pham, D. T., et al., *Intelligent Optimisation Techniques—Genetic Algorithms, Tabu Search, Simulated Annealing and Neural Networks*, Springer-Verlag London Limited, (2000), 302 pgs.
(Continued)

*Primary Examiner* — Xin Jia
(74) *Attorney, Agent, or Firm* — Schwegman Lundberg & Woessner, P.A.

(57) ABSTRACT

A method for controlling the execution of an application with a mobile electronic device (202) in a building (100) having a number of rooms (101), the application usable on the mobile electronic device (202) or usable via the mobile electronic device (202) comprises the steps of: experimentally generating at least one rule; measuring with the mobile electronic device (202) a plurality of location-specific short-range signals, and forming a set ({S(ti)}) of signal vectors (S(ti)) representing short-range signals (s) received from known signal transmitters (201, 202) at each time instant; using said set (C) of sequence classifiers of said at-least-one rule on said set ({S(ti)}) of signal vectors (S(ti)) to determine which sequence classifiers in the set (C) of sequence classifiers match; and controlling the execution of the applica-
(Continued)

tion according to the at-least-one rule. The patent application also contains independent claims for a computer and a computer program product.

19 Claims, 9 Drawing Sheets

(51) Int. Cl.
    *G06F 9/445*     (2006.01)
    *H04W 4/04*     (2009.01)

(58) Field of Classification Search
    USPC .... 455/67.11, 456.1, 456.2, 456.3, 457, 458, 455/461, 41.2
    See application file for complete search history.

(56) References Cited

U.S. PATENT DOCUMENTS

| | | | | |
|---|---|---|---|---|
| 2011/0045846 A1* | 2/2011 | Rekimoto | ............. | G01S 5/0018 455/456.1 |
| 2011/0105097 A1 | 5/2011 | Tadayon | | |
| 2012/0041575 A1* | 2/2012 | Maeda | ................. | G05B 23/024 700/80 |
| 2012/0046045 A1* | 2/2012 | Gupta | ................... | G01S 5/0252 455/456.1 |

OTHER PUBLICATIONS

"International Application Serial No. PCT/EP2012/068583, International Search Report mailed Jan. 2, 2013", 2 pgs.
Divina, F., et al., "Handling Continuous Attributes in an Evolutionary Inductive Learner", *IEEE Transactions on Evolutionary Computation*, 9(1), (Feb. 2005), 31-43.
Krose, B., et al., "An Introduction to Neural Networks", University of Amsterdam, (Nov. 1996), 135 pgs.
Xing, Z., et al., "A Brief Survey on Sequence Classification", *SIGKDD Explorations*,12(1), (2010), 40-48.
Zhang, Y., "Wireless Acquisition of Process Data", ETLA Elinkeinoelaman Tutkimuslaitos (The Research Institute of the Finnish Economy), Discussion Paper No. 1250, (May 24, 2011), 56 pgs.

* cited by examiner

METHOD AND A COMPUTER PROGRAM PRODUCT FOR CONTROLLING THE EXECUTION OF AT LEAST ONE APPLICATION ON OR FOR A MOBILE ELECTRONIC DEVICE, AND A COMPUTER

RELATED APPLICATION

This application is a U.S. National Stage application filed under 35 U.S.C. §371 of PCT/EP2012/068583, filed Sep. 20, 2012 and published as WO 2013/041648 A1 on Mar. 28, 2013, which claims priority to European Patent Application Serial Number 11182075.9, filed Sep. 20, 2011; which applications and publication are incorporated herein by reference and made a part hereof in their entirety.

FIELD OF THE INVENTION

The present invention relates to the field of computer programming, and more particularly to controlling the execution of applications on or for a computer.

BACKGROUND ART

The processing power and possibilities offered by modern user interfaces of certain mobile electronic devices, such as personal digital assistants, smart phones and the like, in particular those using the Apple operating system, the Android operating system, the Windows Mobile operating system, or similar, have developed so much in recent years that these devices can be used for multiple purposes. Normally, the using of a mobile electronic device of the above kind involves controlling the execution of at least one application on the mobile electronic device. If the application is an application located remotely with respect to the mobile electronic device, the application for the mobile electronic device is controlled.

The inventor participated in a project in which the use of different healthcare applications by staff of a healthcare unit (hospital) was observed. The healthcare applications were used through smart phones or through computer terminals in rooms for administrative tasks. When a staff member wanted to start a particular application with his or her smart phone, he or she selected the application by touching the touch screen of the smart phone, for example. In order to protect sensitive data, in most applications it was necessary for the staff member to log in to the application by entering his or her login data (such as user name and password). Some applications were operated locally on the smart phone and some were used over a communications network such as wireless local network, most commonly via a browser.

We observed that most members of the staff in the healthcare environment had to use a number of applications. The maximum number of applications required for an individual was around twenty. Most staff members felt that remembering passwords was difficult. Furthermore, since the active session in the applications was terminated after a certain time had elapsed from the log-in, we found that the log-in in different applications had to be performed repeatedly during the work shift.

We were shocked to find that selecting applications, starting them and giving the login data took, in extreme cases, up to 20 percent of the total working time of individual staff members.

SUMMARY OF THE INVENTION

The objective of the present invention is to speed up the controlling of execution of such an application with a mobile electronic device that is usable on the mobile electronic device or via the mobile electronic device, in a building having a number of rooms, at least in the sense that the amount of human intervention required can be reduced.

This objective can be met with a computer program product according to claim 1 and with a method according to claim 7. The objective can also be met with a computer according to claim 14.

The dependent claims describe various advantageous embodiments of the invention.

ADVANTAGES OF THE INVENTION

If in the method and computer program product for controlling the execution of an application with a mobile electronic device in a building having a number of rooms, the application usable on the mobile electronic device or usable via the mobile electronic device, the method comprises the steps of or the computer program, when executed in a processor is adapted to:

experimentally generating at least one rule containing a set of sequence classifiers defining the relationship between at least one short-range signal trace and application control as a time series, a location series or as a combination of both;

measuring with the mobile electronic device, preferably by its software driver with an interface supporting location-specific short-range signal transmitter identification and optionally also signal-level measurement, a plurality of location-specific short-range signals emitted by signal transmitters located in the building, and forming a set of signal vectors representing short-range signals received from known signal transmitters at each time instant;

using said set of sequence classifiers of said at-least-one rule on said set of signal vectors to determine which sequence classifiers in the set of sequence classifiers match with the at-least-one short-range signal trace as a time series, a location series or as a combination of both; and controlling the execution of the application according to the at-least-one rule for which the sequence classifiers in the set of sequence classifiers match with the at-least-one short-range signal trace as a time series, a location series or as a combination of both, it becomes possible to reduce the human intervention required to control the execution of applications.

With the method and computer program product, the controlling of the execution of an application with the mobile electronic device can be made rule-based and can thus make automated use of location-specific short-range signals. Because location-specific short-range signals tend to correlate with location information, this information can be used to find the location of the mobile electronic device. Location-based decision-making can thus be automated, which is apt to reduce human involvement in controlling the execution of an application and therefore can speed up control of the execution of an application. When the mobile electronic device is in a particular location, a certain application may always be started automatically, for example.

If, in the controlling step, the application that is to be controlled is selected from a plurality of applications by using the time series and/or location series in said plurality of measured location-specific short-range signals, the controlling of applications can so be made more sophisticated, since not only the most recent location information of the mobile electronic device, but also its past location information can be used in the decision-making.

According to an advantageous aspect of the method and computer program product, signal transmitters are or comprise electronic devices and/or mobile electronic devices, and as the measured short-range signals identifiers of the transmitters of such electronic and/or such mobile electronic devices and their respective signal levels are read. If descriptors of electronic devices are read as location-specific short-range signals, the handling of location information can be automated. In an advantageous embodiment, such descriptors are or comprise identifiers of the transmitters of electronic devices and their respective signal strengths; in what follows we use terms signal strength and signal level as synonyms. The arrangement may enhance the accuracy of location determination that is possible by using the location-specific short-range signals, since not only the information about which electronic devices were detected, but also the respective signal strengths, can be used to determine location more accurately. In particular, in such arrangements where the signal strength decreases by a negative power of the distance from the transmitter, this may be very useful.

This can be made more versatile, if, in the set of sequence classifiers, allowed lower and upper values of each short-range signal are specified and allowed variations of the lengths in time series are specified, as well as the allowed variations of their distances from each other; and/or redundant short-range signal traces are removed from the short-range signal trace; and/or all or at least some elements in the array are coverted to a logical value.

The lower and upper values of the short range signal (strength) are probable to correlate with the distance between the emitter of the signal and the mobile electronic device. The lower values can thus be interpreted as maximum (allowed) distance and the upper values can similarly be interpreted as minimum (allowed) distance.

The redundant short-range signals can be the signals that are emitted by such signal transmitters that are not of relevance for a particular rule.

The transformation to a logical value transforms the short range signal to a logical value and thus simpler to handle than a real, floating point, integer or complex value. The transformation to a logical value may involve the verification whether or not the particular short-range signal (strength) is below a certain lower or upper limit, beyond a certain lower or upper limit, or between a certain range, and/or whether or not particular short-range signal is emitted by such a signal transmitter that is or is not of relevance.

According to an advantageous aspect of the method and computer program product, said at least one rule is configurable or configured to operate in addition to location-specific short range signals also on valuations from signals of at least one sensor in the mobile electronic device indicating i) which particular user is using the mobile electronic device, ii) how the mobile electronic device is being moved, and/or iii) light or sound recorded by the mobile electronic device.

With the configuration according to i), the decision-making can be made person-dependent or user category-dependent. Returning to our hospital example, this would enable having different application control for a trainee, for a qualified nurse, for a doctor or a technician working in the hospital.

With the configuration according to ii), I have in mind the following: we want to know whether the user of the mobile electronic device is sitting, walking, standing etc. To obtain this information, I prefer to use a gyroscope, a step meter, an accelerometer or similar as the sensor or the sensors. Information from these kinds of sensors (either alone or in any combination) as a time series, location series or both can be used to determine how the mobile electronic device is being moved.

With the configuration according to iii), we may determine under what kind of circumstances or surroundings the mobile electronic device is being used or transported.

According to one aspect of my invention, the set of sequence classifiers comprises at least one stencil. When determining which sequence classifiers in the set of sequence classifiers match with the at-least-one short-range signal trace as a time series, as a location series or as a combination of both, it is counted whether the holes of the stencil are non-empty. This stencil-approach can be made computationally very effective. In addition, it can be reduced to practice relatively easily.

Preferably, in the controlling step, at least one of the following may be carried out: a) starting or activating the application; b) bringing the application from the background to the foreground; c) retrieving previously stored log-in information for the application and entering it into the application; d) closing the application or bringing it into the background; e) controlling the application; f) starting or activating a program that measures external information and/or controls an external automation system, in particular a healthcare or hospital automation system, an industrial automation system or a building automation system.

By automating any of these execution control functions, it may be possible to reduce the required human intervention and therefore speed up the controlling of the execution of an application.

With external automation system I in particular mean systems that may be used in healthcare, hospital, industrial automation or building automation. With my invention, it will thus be possible to control any of these automation systems with less human interaction.

Above and in the following, a series means a sequence of measurements having at least two measurement points.

Typically, a time series is a series that is measured at successive times spaced at uniform time intervals. However, in the context of the present invention, we understand a time series as a series where the time intervals do not need to be uniform but in addition or instead of may be non-uniform and/or variable.

A location series comprises at least two measurement points of any different locations.

By using the time series, the location series or the combination of these in said plurality of measured location-specific short-range signals, the application that is to be controlled is selected from the plurality of applications.

If the rule is adapted to analyze the time series, the location series or the combination of these by at least one sequence classification algorithm in order to generate selection information about which application is to be controlled, it will still be possible to select the application to be controlled even if no unambiguous selection can be made from the location information.

If the rule is modified by using at least one self-learning algorithm, the controlling of the execution of an application can be made more versatile. The mobile electronic device can learn usage patterns that are typical for its current user and adapt its functioning respectively. In this way, the user can be offered the possibility to control the applications that he or she usually wants to control in that particular situation.

If the computer is a mobile electronic device that is adapted to use location-specific short-range signals measured by itself as the location-specific short-range signals and to control the execution of at least one application on itself, the ease-of-use of the mobile electronic device may be increased.

If, instead of this or in addition to this, the computer is adapted to use location-specific short-range signals measured by a remote mobile electronic device and to control the execution of at least one application on or for said remote mobile electronic device, the mobile electronic device may be simpler, since the control function may need to be implemented on the computer only and not on the remote mobile electronic device.

LIST OF DRAWINGS

In the following, the invention is described in more detail by reference to the examples shown in the attached drawings in FIGS. 1 to 14, in which.

The same reference numerals refer to the same technical features in all drawings.

DETAILED DESCRIPTION

Figure 1:
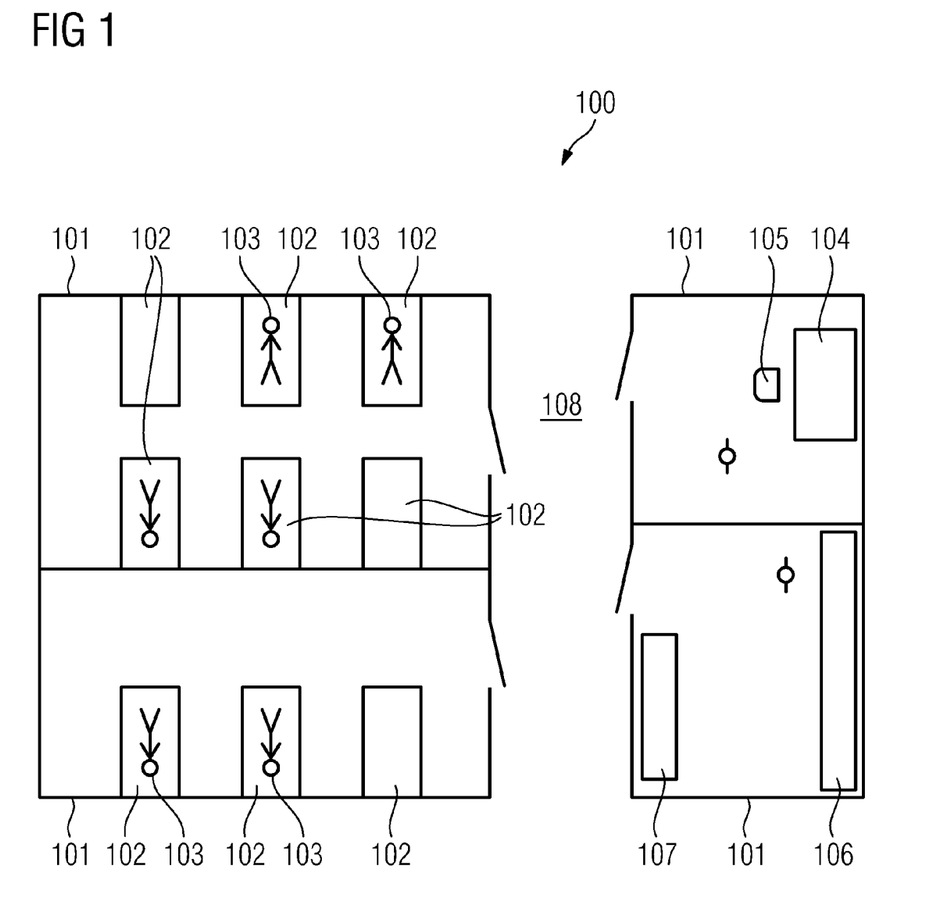
FIG. 1 illustrates one floor of a hospital.

FIG. 1 shows one level of a hospital 100. The hospital 100 has a plurality of rooms 101 which may be connected to each other by floors 108. Some of the rooms 101 are furnished with beds 102 for patients 103. Some rooms 101 may be reserved for administrative tasks and therefore equipped with office chairs 105, tables 104 and other office furniture. Some rooms 101 may have shelves 106 for special equipment and cabinets 107 for medicines.

Figure 2:
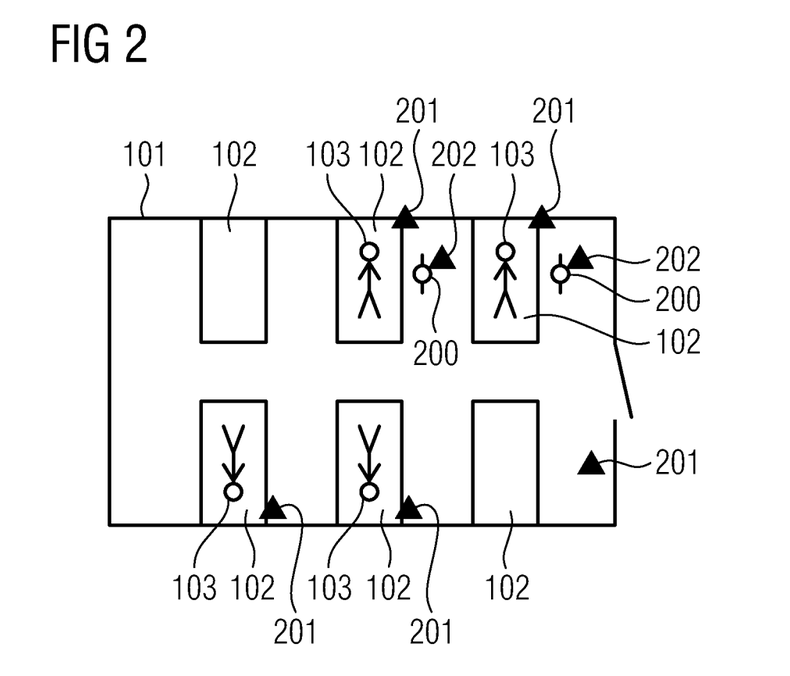
FIG. 2 illustrates the use of mobile electronic devices and electronic devices in the hospital shown in FIG. 1.

FIG. 2 shows hospital staff 200, such as nurses and doctors, visiting some of the patients 103. Each of the hospital staff 200 carries a mobile electronic device 202, such as a smart phone, for example.

Figure 9:
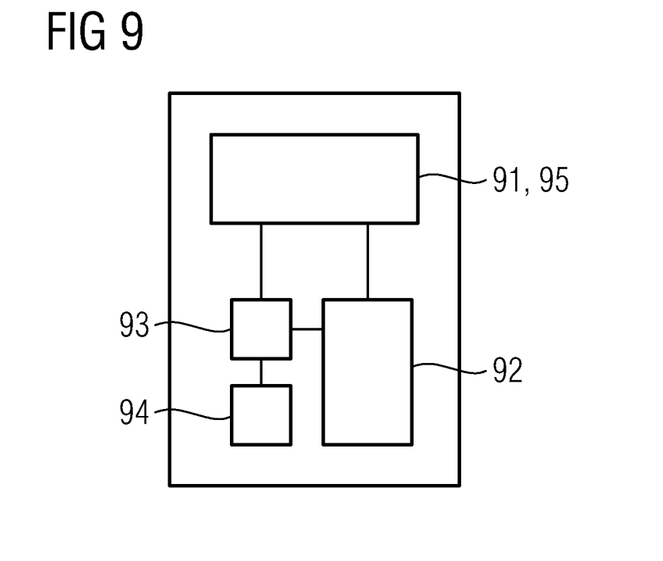
FIGS. 9 and 10 schematically illustrate the structure of a mobile electronic device.

The mobile electronic devices 202, one of which is schematically shown in FIG. 9, comprise an input means 91 such as a touch-sensitive screen, an output means 95 such as a display, a processor 93, a memory 92 and a communication unit 94.

Figure 10:
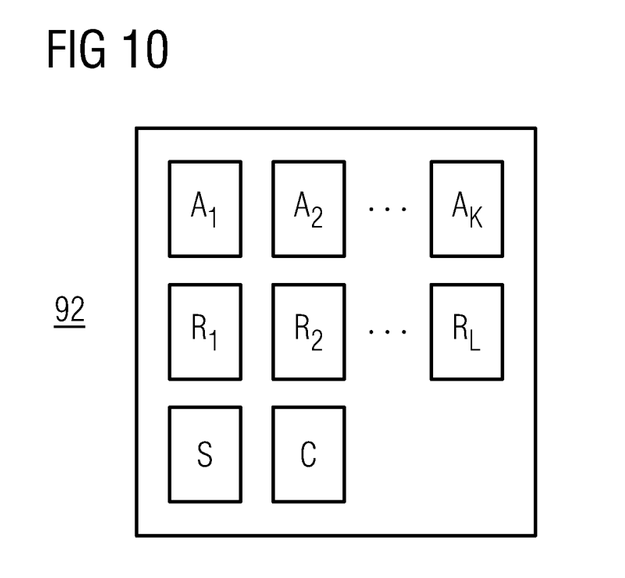

A mobile electronic device (which in particular may be a smart phone, a mobile phone, a portable computer, a table computer, or such like) can be understood to be a sort of mobile computer which can handle applications stored locally, or at least a browser through which one or more applications can be used remotely. As schematically illustrated in FIG. 10, the mobile electronic devices 202 comprise at least one application but preferably a number of applications $A_1, A_2, \ldots, A_K$. The mobile electronic devices 202 also comprise a number of rules $R_1, R_2, \ldots, R_K$, recorded signals S and classifiers C.

Returning to FIG. 2, we also see that at least the beds 102 with a patient 103 are equipped with electronic devices 201. There may also be room-specific electronic devices 201 present in the hospital 100.

The electronic devices 201 may be any kinds of electronic devices that comprise a radio transmitter for communicating with the mobile electronic devices 202.

Instead of this or in addition, they may be light emitters (most preferably in the ultra violet or infra-red spectrum) or sound emitters (most preferably each having a frequency that is not audible for humans, such as over 15 kHz or preferably over 17 kHz).

Instead of this or in addition, low-power radio emitters can be used, in particular those that can be used to convert an audio signal from a portable music player to a Frequency Modulated radio signal.

The transmitter identifier can be coded in the transmitted signal in many ways. The identifiers can include any of the following or they may consist of any of the following (alone or in combination): amplitude, frequency, pulse code modulated in the signal.

If, instead of using Bluetooth transmitters, any of the other transmitters are used, it will be necessary to include a transmitter identifier (transmitter ID) in the received signal. This can be done, for example, by modulating the transmitter ID. Modulation can be performed in a very simple manner for frequency-modulated radio signals, for infra-red light signals and for ultra-violet light signals. Furthermore, the signal strength may be measured and be used in determining the distance of the receiver from the perceived transmitter. In this manner, the signal strength can be used to find out the location of the mobile electronic device 102.

Instead or in addition, the transmitter ID can, of course, be a digital ID. In digital transmission, the identifiers can then be coded in data packet headers.

For the sake of simplicity, the preferred mode of the invention is described here with Bluetooth transmitters used as the short-range signal transmitters. We use the method described in "Wireless Acquisition of Process Data", by Ye Zhang, published in ETLA Elinkeinoelämän Tutkimuslaitos (The Research Institute of the Finnish Economy) Discussion Papers No. 1250 on May 24, 2011.

The inventor has so far tested the invention by using, as the electronic devices 201, computer mice or mobile phones that have an integrated Bluetooth transmitter. The communication unit 94 of the mobile electronic device 202 comprised a Bluetooth communication unit. During the testing, the communication between the electronic devices 201 and the mobile electronic device 202 was carried out by normal Bluetooth inquiry procedure.

Normally, in Bluetooth inquiry, each of the electronic devices 201 broadcast their unique device ID. The communication unit 94 of the mobile electronic device 202 listens to the broadcast signals and stores received signal information s in memory 92.

Figure 3:
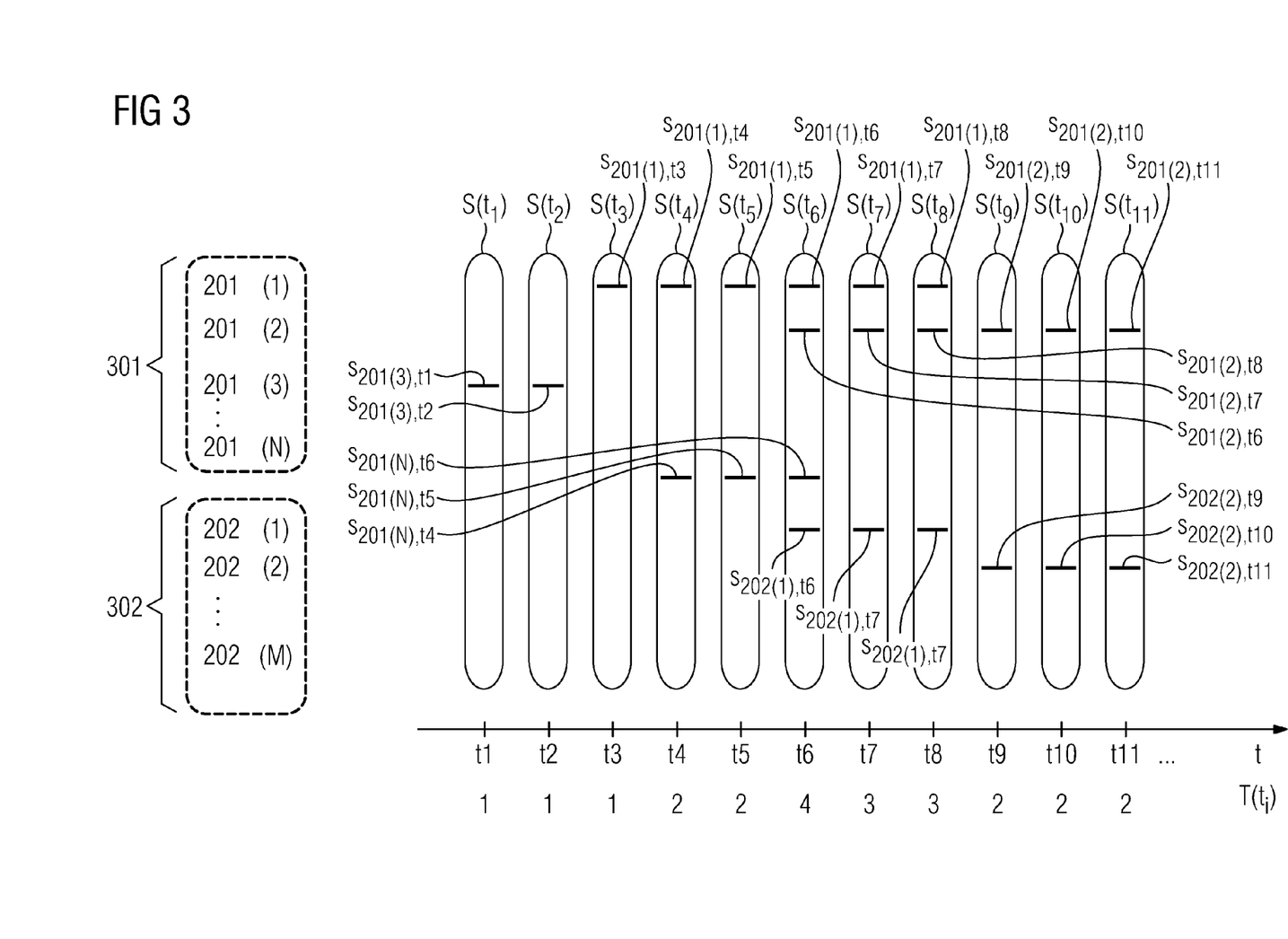
FIG. 3 illustrates the collection of a plurality of measurement data.

FIG. 3 illustrates the collection of a plurality of received signal information s which is stored in the memory of the mobile electronic device 202.

The mobile electronic device 202 can receive signals from N electronic devices 201 and additionally from M mobile electronic devices 202. The short-range signals received from each of the devices are stored in memory 92. FIG. 3 shows each of the short-range signals s stored in the memory 92.

At each instant of time $t_i$ (in FIG. 3 illustrated as t1, t2, t3, . . . , t11, . . . ), the received signals s are stored in a signal vector $S(t_i)$. The signal vector S ($t_i$) has T ($t_i$) non-empty elements, which is the number of the Bluetooth transmitters of electronic devices 201(1) to 201(N) or mobile electronic devices 202(1) to 202(M) that are received by the mobile electronic device 202 at each respective instant of time.

The received signal s201(j),ti comprises the respective transmitter ID of the electronic device 201(1) to 201(N) or mobile electronic device 202(1) to 202(M), optionally also the perceived signal strength at the communication unit 94 of the mobile electronic device 202, and the instant of time $t_i$.

If there is no signal present at s201(j),ti, the corresponding data in the signal vector is empty or has some predefined value that means empty.

In FIG. 3 there are also shown first set 301 and second set 302 of indices used in each signal vector S. At least one of these sets is not empty.

Figure 4:
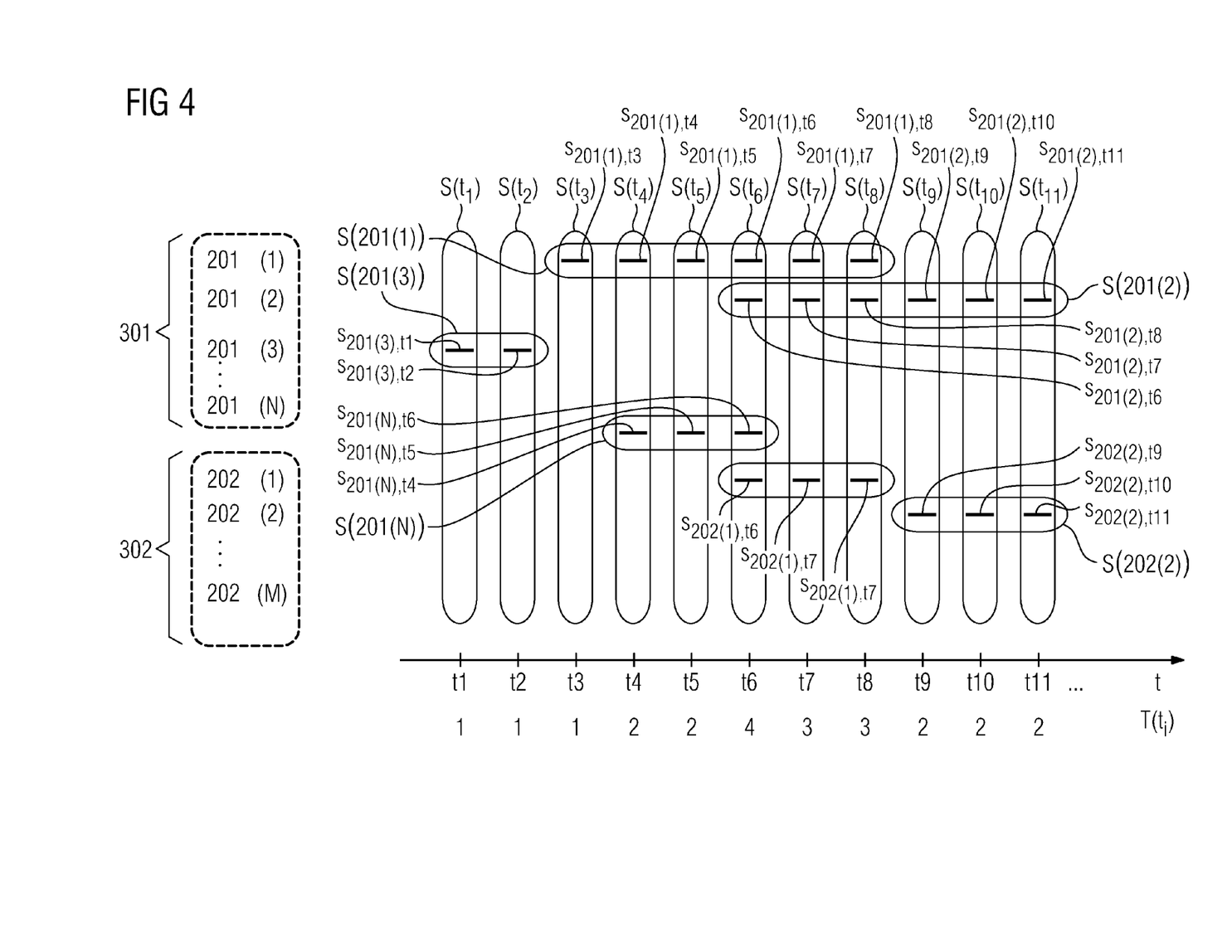
FIG. 4 illustrates the short-range signal trace in coordinates where location is the Y axis and time is the X axis.

As illustrated in FIG. 4, the received signal vector can also be used to make a short-range signal trace. Signal strengths from each of the electronic devices 201(1) to 201(N) or mobile electronic devices 202(1) to 202(M) are measured for a time interval t1, t2, . . . , t11, for example. The short-range signal trace for this time interval from electronic device 201(1) is a position vector S(201(1)), which has a starting point in t3, length 6 and contains the signals s201(1),t3, s201(1),t4, . . . , s201(1),t8 as elements. The short-range signal traces S(201(2)), . . . , S(202(N)) for other electronic devices 201(2), . . . , 201(N) and S(202(1)), . . . , S202(M) for mobile electronic devices are defined similarly. The short-range signal trace for time interval t1, . . . , t11 is the collection of short-range signal traces S(201(i)) and S(202(j)), i=1, . . . , N, j=1, . . . , M.

The short-range signal trace represents a pattern that can be detected from an obtained short-range signal vector. The detection can be simple or advanced. The simple detection of the short-range signal trace can be implemented e.g. as a stencil, where holes are cut around S(201(1)), S(201(2)), . . . , S(202(2)) in the example. When this stencil is placed on the short-range signal vector S(ti) and moved over time as the short-range signal vector is received, the pattern of FIG. 4 is detected when no holes of the stencil are empty. The stencil is a simple detection pattern. Of course, there may be further short-range signals present, but they will be insignificant for the pattern detection since there is no hole for such short-range signals in the stencil.

In advanced detection the allowed lower and upper values of each short-range signal in S(201(1)), S(201(2)), . . . , S(202(2)) can be specified and the allowed variations of the lengths in time of S(201(1)), S(201(2)), . . . , S(202(2)) can be specified, as well as the allowed variations of their distances from each other. In advanced detection, redundant short-range signal traces can also be removed from the short-range signal trace. Several advanced detection patterns can be developed in this way from a given short-range signal trace. The best detection pattern can be chosen by testing in practice.

In FIG. 4, signal sequences S201(i) and S202(j) that are illustrated with horizontal bubbles are examples of time series. Correspondingly, signal vectors $S(t_i)$ that are illustrated with vertical bubbles are examples of location series. In principle, the time and location series may consist of any number of measured signals. However, the longer the series are, the more complicated the "stencil" becomes.

A skilled person is able to develop a graphical editor for editing detection patterns from short-range signal traces. These detection patterns are special cases of sequence classifiers. The advanced detection pattern demonstrated above is a special case of a feature-based classifier in Sequence Classification. Further sequence classifiers that can be used for the implementation of the method can be found in the article "A Brief Survey on Sequence Classification" by Zhengzheng Xing, Jian Pei and Eamonn Keogh, which was published in SIGKDD Explorations 12(1): 40-48 (2010).

For the best possible pattern recognition, many professional sequence classifiers can be developed. In what follows we refer to detection patterns as classifiers C.

It is to be noted that heuristic detection patterns can also be developed and used as classifiers C.

Figure 5:
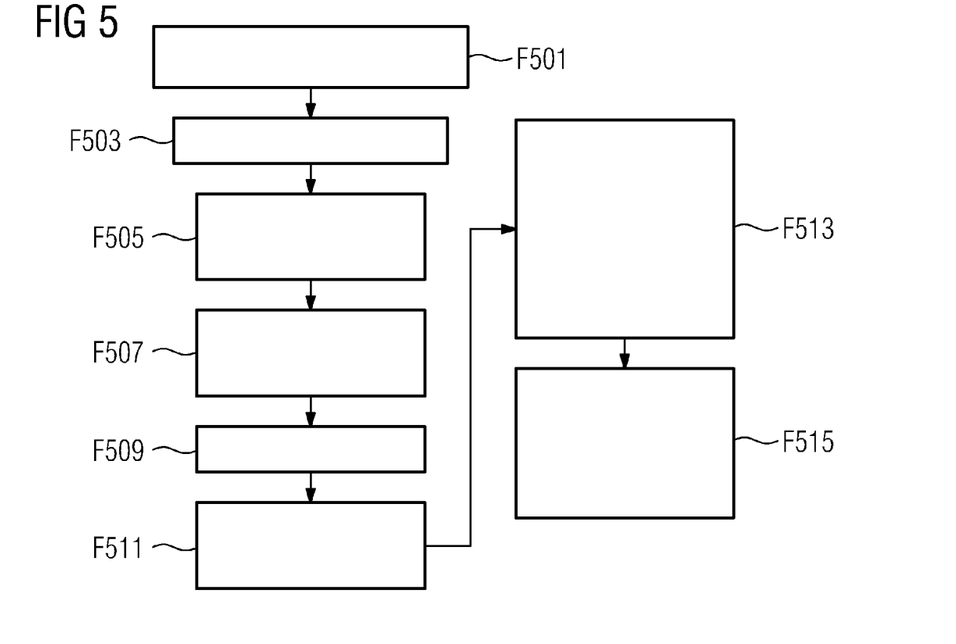
FIG. 5 illustrates how the electronic devices and mobile electronic devices that are used as location-specific short-range signal transmitters are recorded.

FIG. 5 shows how the electronic devices 201 and mobile electronic devices 202 that are used as location-specific short-range transmitters are recorded. In step F501, any such electronic devices 201 and mobile electronic devices 202 that are to be used later in starting applications are shut down, except for the mobile electronic device 202, which is used to record the short-range signal traces.

In step F503, the Bluetooth device inquiry is started at the mobile electronic device 202 used to record the short-range signal traces.

In step F505, all those Bluetooth device IDs that are received at the mobile electronic device 202 used to record the short-range signal traces are first stored in a data structure X.

In step F507, any such electronic devices 201 and mobile electronic devices 202 (these are the "allowed devices") that are to be used later as location-specific short-range transmitters are collected and put in detectable mode, except for the mobile electronic device 202, which is used to record the short-range signal traces.

This means that they start the Bluetooth inquiry procedure and can thus be perceived (in step F509) by the mobile electronic device 202 used to record the short-range signal traces, which is in the Bluetooth device inquiry mode.

In step F511 the found device identifiers are stored in a data structure Y.

In step F513, device identifiers that are in data structure Y but not in data structure X are stored in an "Allowed Bluetooth Devices" data structure. This data structure comprises the BluetoothDeviceClass, with data fields deviceAddress and deviceName.

In step F515, the obtained "Allowed Bluetooth Devices" are stored in a file.

Figure 6:
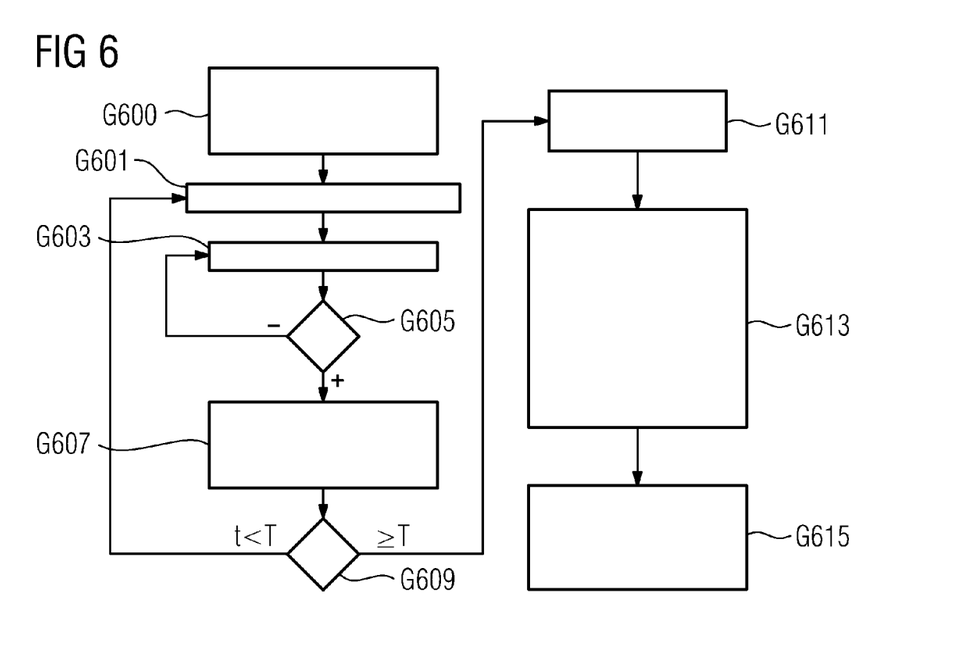
FIG. 6 illustrates how rules defining the relationship between the short-range signal trace and application control information are generated.

FIG. 6 illustrates the procedure for generating the sequence classifiers defining the relationship between short-range signal traces and application control information.

In step G600, the teaching of classifiers for a certain application $A_i$, which is any of $A_1, A_2, \ldots, A_K$, is started. First, the application ID of the application Ai is requested. Then, a teaching period of length T is selected. This may be entered by the user or may be a pre-defined time length. Then, short-range signal trace $VR(t_i)$ is initiated at $t_1=0$.

Most advantageously, the short-range signal trace $VR(t_i)$ is similar to any of the signal vectors $S(t_i)$ in FIG. 3 or any of the processed signal vectors $S201(j)/S202(j)$ in FIG. 4. The short-range signal trace $VR(t_i)$ comprises the measured signal, or signals derived from it by processing at time $t_i$.

In step G601, the Bluetooth device inquiry is started in the mobile electronic device 202 and t is set to $t_1$.

In step G603, the mobile electronic device 202 listens to the Bluetooth device inquiry results.

In step G605, it is tested whether the Bluetooth device inquiry has been finished. If not, the control is returned to step G603. If yes, in step G607, the identifiers of all observed devices (electronic devices 201 and mobile electronic devices 202), and optionally their signal strengths and time are written in the short-range signal trace $VR(t_i)$ and $t_i$ is increased by one unit (such as from $t_1$ to $t_2$).

In step G609, it is tested whether the duration T of the teaching period has been reached, i.e. whether t<T. If not, the process is continued at step G601. If yes, in step G611, the obtained short-range signal trace VR(ti) is stored.

In step G613, a sequence classifier C is generated corresponding to the short-range signal trace VR(ti). If necessary, the allowed variations in time and in signal strength are checked. These may be modified by the user, if desired. For this purpose, a graphical editor may be used to interactively support the generating of the sequence classifier C from the short-range signal trace as in the explanation of FIG. 4.

Instead of using the method described above with reference to FIG. 4 to generate the classifier C, there are also several heuristic self-learning algorithms that can be used. Such algorithms include Neural Networks, Support Vector Machines and Evolutionary Algorithms.

Alternatively or in addition, when the method described above is used repeatedly, several short-range signal traces are obtained. Based on these, a heuristic algorithm can be developed that behaves as a detection pattern and detects similar traces. Self-learning algorithms that can be used in such classifier generation can be found e.g. in B. Kröse, P. Smagt, An introduction to Neural Networks, University of Amsterdam, November 1996;

D. Karaboga, D. Pham, Intelligent Optimisation Techniques: Genetic Algorithms, Tabu Search, Simulated Annealing and Neural Networks, Springer Verlag, 2000;

F. Divina, E. Marchiori, Handling Continuous Attributes in an Evolutionary Inductive Learner, published in IEEE Transactions on Evolutionary Computation, vol. 9, no. 1, February 2005.

In step G615, the sequence classifier C is stored in a file.

Rules $R_i$ are defined as sets $C_{i,j}$ of classifiers, i=1, ... L and j=1, ..., H. Each rule $R_i$ can be related to a special user group and the usage situation of the mobile electronic device 102. Each classifier $C_{i,j}$ is related to one or more applications A and its or their control information.

Figure 7:
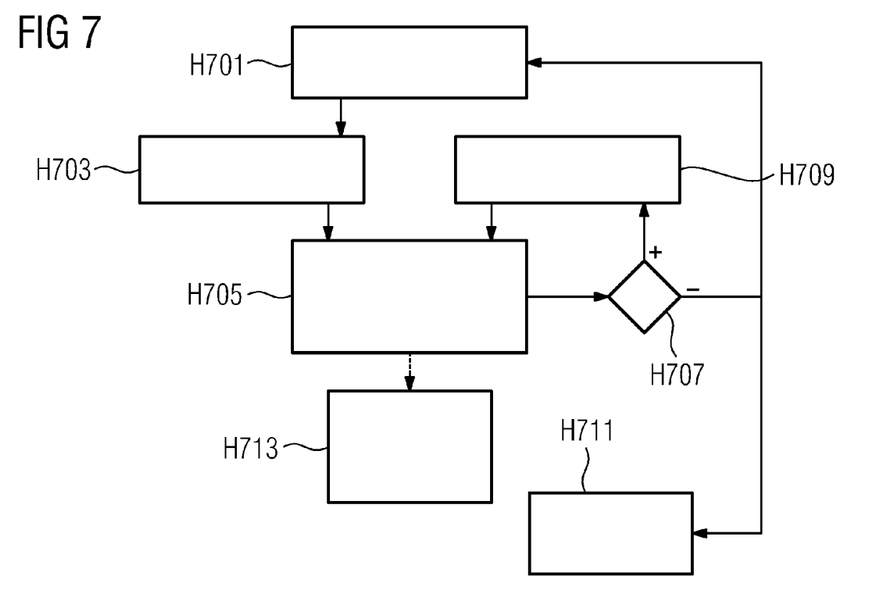
FIG. 7 illustrates how the rule is used on said plurality of location information to control the execution of an application on or for the mobile electronic device.

FIG. 7 illustrates how a rule $R_i$ (i=1, ..., L) is used in practice (if there are totally L rules $R_i$).

In step H701, a signal vector $S(t_i)$ is read where the largest $t_i$ is the last instant of time of the signal reception.

In step H703, a first classifier $C_1$ from the group of allowed classifiers $C_{i,j}$ (j=1, ..., H) (if there are H classifiers $C_{i,j}$ in total for the rule Ri) is selected as the current classifier $C_{i,j}$.

In step H705, the signal vector $S(t_i)$ is analyzed with the current classifier $C_{i,j}$ and, if any application $A_k$ (k=1, ..., K) is matched, the identity of the application $A_k$ is stored in a list B in step H713.

In step H707, j is increased by one, after which it is tested whether a next classifier $C_{i,j+1}$ exists, i.e. whether j<H. If no, in step H711, the applications A listed in list B are controlled. If yes, in step H709, the next classifier $C_{i,j+1}$ to the current classifier $C_{i,j}$ is taken from the group of allowed classifiers.

In other words, the rules $R_i$ define the relationship of signal classifiers $C_{i,j}$ and applications $A_k$ and the application control information.

Each rule $R_i$ may relate to a particular person (or profession) and/or location (such as the department in a hospital, for example). Instead of or in addition to this, each rule may be time-dependent (such as a night shift or day shift).

The application control information defines how a particular application $A_k$ is to be controlled. Some of the possible options are:
a) the application $A_k$ is started or activated;
b) the application $A_k$ is brought from the background to the foreground or from the foreground to the background;
c) previously stored log-in information for the application $A_k$ is retrieved and entered into the application $A_k$;
d) the application $A_k$ is closed or brought into the background;
e) the application $A_k$ is controlled; or
f) such a program is started or activated that measures external information and/or controls an external automation system, in particular a healthcare or hospital automation system, an industrial automation, or a building automation system.

The program may be stored on the mobile electronic device 202, on another mobile electronic device 202, on a computer, or on any device being part of the automation external automation system.

Figure 8:
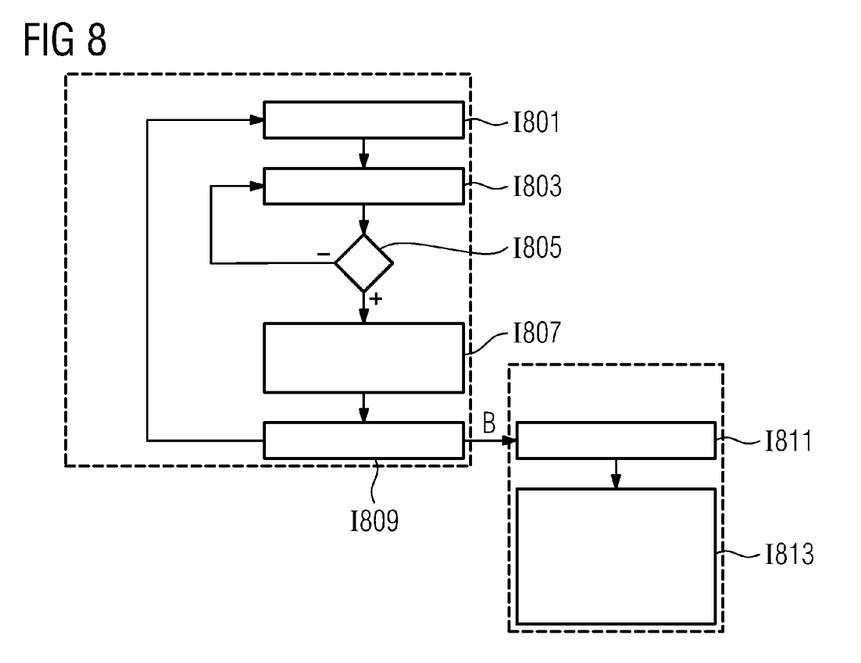
FIG. 8 illustrates the receiving of a plurality of location-specific short-range signals at a mobile electronic device and using at least one rule on said plurality of location-specific short-range signals to control the execution of an application on or for the mobile electronic device as a continuous process.

FIG. 8 illustrates the process of receiving a plurality of location-specific information of a mobile electronic device 202 and of using at least one rule on said plurality of location-specific information $S(t_i)$ to control the execution of an application $A_k$ (k=1, ..., K) on or for the mobile electronic device 202.

In step I801, the Bluetooth device inquiry is started at the mobile electronic device 202.

In step I803, the inquiry results are listened to.

In step I805, it is tested whether the inquiry has been finished. If not, the control is returned to step I8903. If yes, in step I807, the electronic devices 201 and/or the mobile electronic devices 202, time instant t, and the respective signal strengths are added to the signal vector $S(t_i)$.

In step I809, the signal vector $S(t_i)$ is handled using a pattern-recognition algorithm and compared with the allowed classifiers, as in FIG. 7.

In step I811, the applications specified in list B are started.

In step I813, each of the applications $A_k$ in list B are kept on screen for a pre-determined time. The pre-determined time can be the same or different for each application $A_k$. After the pre-determined time has elapsed, the respective application is closed. Optionally, a reminder is shown so that the user can start the application later, if necessary.

Figure 11:
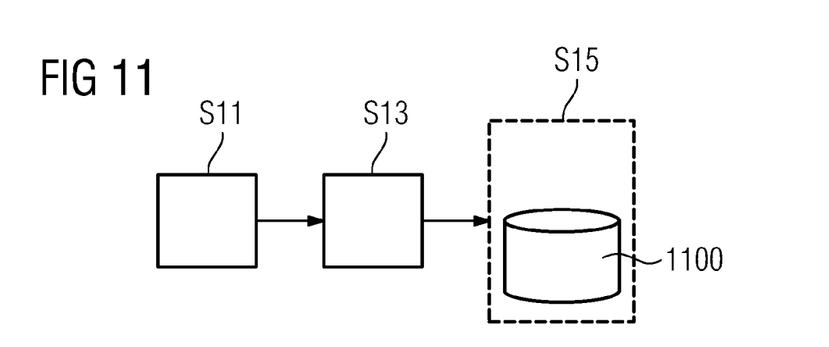
FIG. 11 a simple determining process.

FIG. 11 illustrates a simple determining process utilizing a stencil database 1100, the process being able to be performed at a mobile electronic device 202 or at a remote computer.

In step S11 logical data is loaded. With logical data we mean logical-valued (true or false) valuations of location-specific short-range signals received by the mobile electronic device 202 and/or from at least one of its sensors indicating i) which particular user is using the mobile electronic device or to which category of users the user using the mobile electronic device belongs, ii) how the mobile electronic device is being moved, and/or iii) light or sound recorded by the mobile electronic device 202.

In step S13 binary data is integrated i.e. at each instant of time a signal vector $S(t_i)$ is stored and the time sequence of these signal vectors forms an array where the abscissa denotes time units and the ordinate signal vector indices.

In step S15 decision-making is made by comparing the logical array with the stencils stored in the stencil database 1100. Stencils stored in the stencil database 1100 are most conveniently stored there as logical (binary) arrays.

Figure 13:
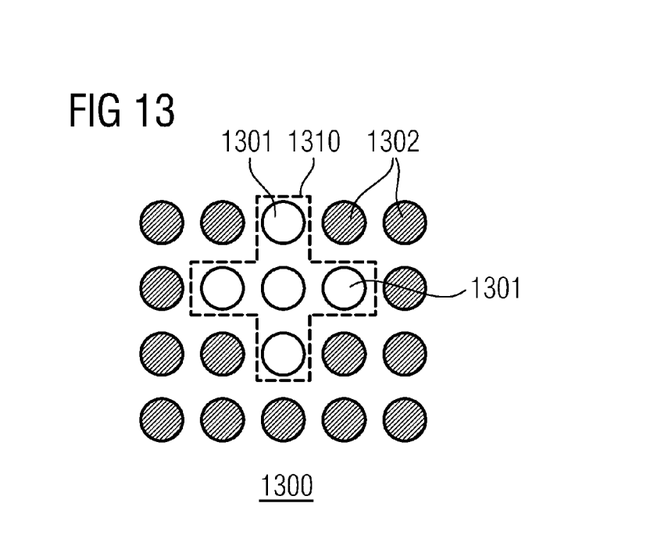
FIG. 13 a simple stencil.

FIG. 13 illustrates an example of a simple stencil 1300. The abscissa denotes time units and the ordinate signal vector indices. The required holes 1301 in the stencil 1300 are marked white while the other positions in the stencil are dark. The exemplary stencil 1300 has now a number of openings extending in both directions. It is clear that the number of rows and columns of the stencil 1300 in a real-world case may be different and that the number and location of the holes may be different.

In the example of FIG. 13, the white holes 1301 correspond to those signal vector indices that have to be present at certain time (such as, signal strength being above a first threshold, below a second threshold, between a range of a third threshold and a fourth threshold). So we understand that FIG. 13 represents four time vectors. The totality of the holes 1301 has been marked with reference numeral 1310. The requirement of the stencil 1300 is then considered fulfilled if all holes 1301 in the totality 1310 of holes can be determined at the mobile electronic device 202.

In the simple stencil 1300, for the white holes 1301 we have as logical value "true" and for the remaining positions 1302 "false". Of course, the stencil 1300 could be inverted so that totality of the positions which must not be present are marked with "true" and the totality of the other positions should then be marked with "false".

Figure 12:
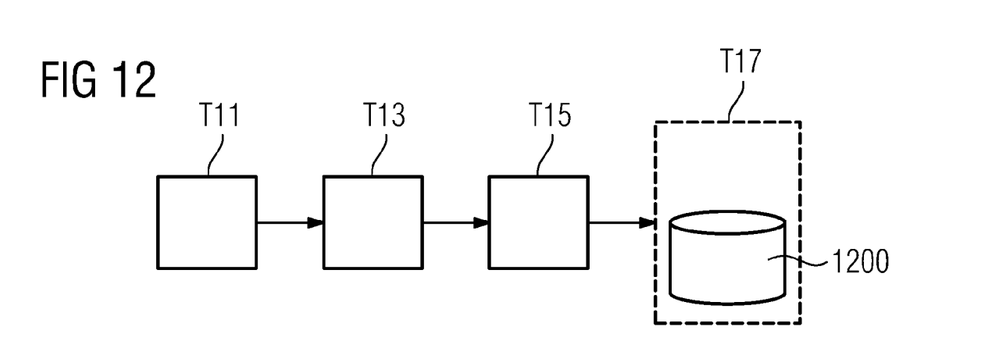
FIG. 12 a more advanced determining process.

FIG. 12 illustrates a determining process that is more advanced than the determining process of FIG. 11.

In step T11, floating point (or real or complex) valued data 1401 is loaded. With such data 1401 we mean valuations of location-specific short-range signals received by the mobile electronic device 202 and/or from at least one of its sensors indicating i) which particular user is using the mobile electronic device or to which category of users the user using the mobile electronic device belongs, ii) how the mobile electronic device is being moved, and/or iii) light or sound recorded by the mobile electronic device 202.

In step T13, the floating point (or real or complex) valued data 1401 is transformed to logical (binary) data 1301, 1302 through at least one filter F. In step T15, logical data integration is performed similar to step S13. In step T17, decision making is performed similarly to step S15 by comparing the array obtained from steps T13 and T15, with the stencils stored in the stencil database 1200. The stencils stored in the stencil database 1200 are most conveniently stored there as logical (binary) arrays.

Figure 14:
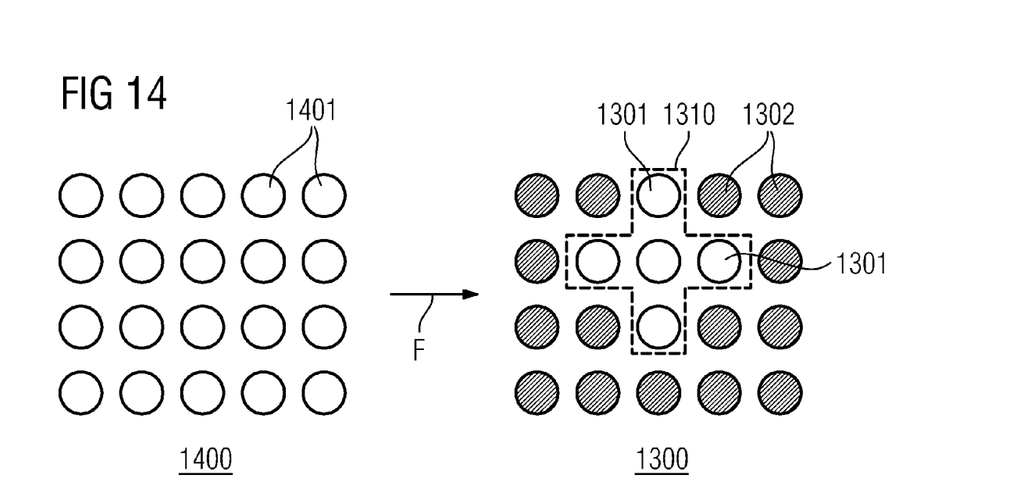
FIG. 14 reduction of an advanced stencil to a simple stencil.

FIG. 14 illustrates the transformation for reduction of an advanced stencil 1400 to a simple stencil 1300. The floating point (or real or complex, generally "continuous") values 1401 at positions of the advanced stencil 1400 are filtered through the at least one filter F in order to obtain binary (logical) values 1301, 1302. This transformation is preferably made for i) valuations of location-specific short-range signals received by the mobile electronic device 202 and/or from at least one of its sensors indicating i) which particular user is using the mobile electronic device or to which category of users the user using the mobile electronic device belongs, ii) how the mobile electronic device is being moved, and/or iii) light or sound recorded by the mobile electronic device 202 that are used in set C of sequence classifiers and therefore stored in stencil database 1100 or 1200; as well as for ii) valuations of location-specific short-range signals received by the mobile electronic device 202 and/or from at least one of its sensors indicating i) which particular user is using the mobile electronic device or to which category of users the user using the mobile electronic device belongs, ii) how the mobile electronic device is being moved, and/or iii) light or sound recorded by the mobile electronic device 202 that are measured or determined by the mobile electronic device 202 and therefore loaded in step S11 or T11.

To generalized the above statements, a stencil 1300, 1400 has holes which describe the signals that have to be present in a certain event. The holes can cover several locations or synonymously several elements (or indices) of the signal vector at certain time (holes in ordnata direction in FIG. 13) or several moments (holes in abscissa direction in FIG. 13). In a stencil 1300, 1400 these holes in abscissa and ordnata direction define the detection pattern 1310 of the stencil.

In other words, in FIG. 13 there is an example stencil 1300 with five holes 1301 denoted as white circles, and the stencil can also be cut along the dashed lines in FIG. 13. If there are nonzero values in every hole of the stencil, then the detection pattern of the stencil 1300 is detected. This is called as simple detection where the signals are binary, which means that they are detected as on/off style ("on" means that the signal is detected, "off" means that no signal is detected).

In advanced detection we allow continuous values of measured signals which are transformed to binary values to apply the previous simple detection procedure. In the advanced detection also other signals can be augmented to the short range signal vectors to form a more generic signal vector, such as calculated values from other sources.

For example, let us consider an advanced signal vector $S(X(i,t), Y(j,t), Z(k,t))$ received by a mobile device 202 at time instant t, where $X(i,t)$ is a subvector of short range signal vector with indices 301 i.e. vector from transmitters 201(i) (i=1, . . . , N), and $Y(j,t)$ is a subvector of short range signal vector with indices 302 i.e. vector from mobile devices 202(j) (j=1, . . . , M).

According to an aspect of the method and computer program product, there the signal vector may also comprise further subvectors.

For example, subvector $Z(k,t)$ can be used in the signal vector as a vector of valuations from internal signals of sensors k in the mobile electronic device 202 (k=1, . . . , P), such as probability of walking $Z(1,t)$, standing $Z(2,t)$ or sitting $Z(3,t)$ calculated from the accelerometers or other sensors in the mobile electronic device 202.

At least either of X or Y is nonzero.

We may define the transformation F from the advanced signal vector $S(X(i,t), Y(j,t), Z(k,t))$ to the simple signal vector $S(u,t)$ by some rule R (u=1, . . . , Q) so that continuous values are mapped on binary ones.

The number of indices in the advanced signal vectors (cf. set 1400 of signal vectors in FIG. 14) and the number of indices in the simple signal vector (cf. set 1300 of signal vectors in FIG. 13) may be different. Typically, the number of indices is less in the simple signal vector. The number of indices usually decreases in the transformation F.

We then apply simple stencil to obtained binary valued signal vector S(u,t).

By a "short-range signal" we mean a signal that is both transmitted and received locally. Locally means in this context that both transmission and receiving take place in one building, in one room, or even in a part of a room.

Short-range signals may be radio signals, in particular on the license-free ISM (Industrial, Scientific and Medical) band between 2,402 GHz and 2,480 GHz, such as in the Bluetooth (IEEE 802.15.1) standard.

Alternatively or in addition, short-range signals may be local wireless network (such as WLAN) signals, in particular signals according to any one of the IEEE 802.11, IEEE 802.11a/h, IEEE 802.11b/g or IEEE 802.11n standards, Near Field Communication (NFC), Zigbee or any comparable standards.

Alternatively or in addition, short-range signals may be optical signals (most preferably using some part of the ultraviolet or infra-red spectrum) or audio signals (most preferably using frequencies that are not audible for humans, such as over 15 kHz or preferably over 17 kHz).

Alternatively or in addition, short-range signals may be signals from an inductive or capacitive short-range connection. The inventor has even tested the invention with low-power radio emitters.

According to a further aspect of the invention, the computer program product for controlling the execution of at least one application on or for a mobile electronic device and stored on a computer-readable medium is characterized in that it comprises computer-readable program code, which, when executed in a processor, is adapted:
  to receive at least one rule defining the relationship between at least one short-range signal trace and an application control;
  to receive a plurality of location-specific short-range signals measured by a mobile electronic device, preferably by its software driver with an interface supporting location-specific short-range signal transmitter identification and optionally also signal-level measurement; and
  by using said at-least-one rule on said plurality of location-specific short-range signals, to control the execution of an application on or for the mobile electronic device, provided the at-least-one in the plurality of the location-specific short-range signals is determined to match with the at-least-one, short-range signal trace.

According to a further aspect of the invention, the method for controlling the execution of an application on or for a mobile electronic device, comprising the steps of:
  receiving at least one rule defining the relationship between at least one short-range signal trace and the application control;
  receiving a plurality of location-specific short-range signals measured by a mobile electronic device, preferably by its software driver with an interface supporting, location-specific short-range signal transmitter identification and optionally also signal-level measurement; and
  by using said at-least-one rule on said plurality of location-specific short-range signals, to control the execution of an application on or for the mobile electronic device, provided the at-least-one in the plurality of the location-specific short-range signals is determined to match with the at-least-one, short-range signal trace.

The many features and advantages of the present invention are apparent from the written description. Further, since numerous modifications and changes will be readily apparent to those skilled in the art, the invention should not be limited to the exact construction and operation as illustrated and described. Hence, all suitable modifications and equivalents may be resorted to as falling within the scope of the invention.

In particular, the invention is not thought to be limited to a hospital building or healthcare building, but could be used in any building, in particular (and not limited to) laboratory, airport, terminal, factory and in general in any production facility or hall, hotel, supermarket or shop, theatre, cinema, car wash facility, trade fair/exhibition hall etc.

In particular, the invention was described above with Bluetooth transmitters used as the short-range signal transmitters. Instead of or in addition to using Bluetooth, any other radio signals on the ISM band can be used, or even FM signals. WLAN, or more particularly IEEE 802.11, IEEE 802.11a/h, IEEE 802.11b/g or IEEE 802.11n, or optical or audio signals can also be used. Also Near Field communication (NFC), Zigbee or any comparable standard may be used.

The computer program product can be distributed as a downloadable software product, or it can be stored on a CD, DVD or any other data carrier.

Rules R (some or all of them) can be stored on a CD, DVD or any other data carrier, on a mobile electronic device or on a computer (such as, on a computer connected or connectable to the internet). The rules R can be distributed one-to-one (such as, peer-to-peer) or one-to-many (such as, peer-to-many). This enables the distribution of rules R from one mobile electronic device to another or to a computer, and from a computer to electronic device (and in the reverse direction too).

Such distributability of rules R makes it possible that a certain rules that have been tested and found out to work well can be distributed to further mobile electronic devices. At different mobile electronic devices, the same rule can control even different applications. I am about to test even such a solution where the rules R can be transferred by bringing another mobile electronic device 202 close to another.

In the hospital and health care and automation context, it is possible to generate rules R for each user or user group and distribute them to mobile electronic devices of such users or of such user groups. This saves much effort because it is not any more necessary to program the rules R for each mobile electronic device at once.

In one practical embodiment, for at least some of the personal, in particular, for qualified nurses and physicians or for laboratory personnel, an electronic door or window lock may be opened if the mobile electronic device is detected to approach the door and locked if the mobile electronic device is detected to leave the vicinity of the door or window. In this embodiment, there can be a transmitter 201 (preferably a Bluetooth device) located close to the door, or the door operation can simply be controlled based on the detection of the task or movement of the person carrying the mobile device. The execution of a door or window opening application at the mobile electronic device or at the computer is controlled by at least one rule R.

The invention claimed is:

1. A computer program product for controlling the execution of at least one application with a mobile electronic device in a building having a number of rooms, the at least one application usable on the mobile electronic device or usable via the mobile electronic device, the computer program product stored on a non-transitory computer-readable medium, wherein the computer program product comprises non-transitory computer-readable program code, which, when executed by a processor, causes the processor to:

read at least one experimentally generated rule containing a set of sequence classifiers defining the relationship between at least one short-range signal trace and application control as a time series and a location series, wherein the experimentally generated rule is time dependent and contains at least three time instants;

measure, with a software driver of the mobile electronic device including supporting location-specific short-range signal transmitter identification and signal-level measurement, a plurality of location-specific short-range signals located in the building;

form a set of signal vectors representing short-range signals received from known signal transmitters at each time instant;

use the set of sequence classifiers of the at-least-one rule on the set of signal vectors to determine which sequence classifiers in the set of sequence classifiers match with the at-least-one short-range signal trace as a time series and a location series; and control the execution of the at least one application according to the at-least-one rule for which the sequence classifiers in the set of sequence classifiers match with the at-least-one short-range signal trace as a time series and a location series.

2. A computer program product according to claim 1, wherein the rule is adapted, by using the time series, the location series or the combination of both in the plurality of measured location-specific short-range signals, to select, from a plurality of applications, the at least one application to be controlled.

3. The computer program product according to claim 1, further adapted to read, as location-specific short-range signals, descriptors of electronic devices that are most advantageously identifiers of transmitters of electronic devices and their respective signal strengths.

4. The computer program product according to claim 1, wherein at least one rule is configurable to operate in addition to location-specific short range signals also on valuations from signals of at least one sensor in the mobile electronic device indicating i) which particular user is using the mobile electronic device or to which category of users the user using the mobile electronic device belongs, ii) how the mobile electronic device is being moved, and iii) light or sound recorded by the mobile electronic device.

5. The computer program product according to claim 1, wherein the set of sequence classifiers comprises at least one stencil, and wherein, when determining which sequence classifiers in the set of sequence classifiers match with the at-least-one short-range signal trace as a time series, as a location series or as a combination of both, it is counted whether the holes of the stencil are non-empty.

6. The computer program product according to claim 1, further adapted to control the execution of at least one application by at least one of the following:
starting or activating the at least one application;
bringing one of the at least one application from the background to the foreground,
retrieving previously stored log-in information for the at least one application and entering it into the at least one application; and
starting or activating a program that measures external information or controls an external automation system, an industrial automation system, or a building automation system.

7. The computer program product according to claim 1, wherein a pre-determined time varies for each of the at least one application.

8. The computer program product according to claim 1, wherein the computer-readable program code is further adapted to cause the processor to check allowed variations in time and signal strength for the set of sequence classifiers.

9. The computer program product according to claim 1, wherein the computer-readable program code is further adapted to cause the processor to:
display the at least one application on a screen of the mobile electronic device for a pre-determined time; and
close the at least one application after the pre-determined time.

10. The computer program product according to claim 1, wherein the experimentally generated rule being time dependent includes the experimentally generated rule being valid during a particular shift.

11. A method for controlling the execution of an application with a mobile electronic device in a building having a number of rooms, the application usable on the mobile electronic device or usable via the mobile electronic device, the method comprising:

experimentally generating at least one rule containing a set of sequence classifiers defining the relationship between at least one short-range signal trace and application control as a time series and a location series, wherein the at least one rule is time dependent and contains at least three time instants;

measuring, with a software driver of the mobile electronic device preferably by its supporting location-specific short-range signal transmitter identification and optionally also signal-level measurement, a plurality of location-specific short-range signals emitted by signal transmitters located in the building, forming a set of signal vectors representing short-range signals received from known signal transmitters at each time instant;

using the set of sequence classifiers of the at-least-one rule on the set of signal vectors to determine which sequence classifiers in the set of sequence classifiers match with the at-least-one short-range signal trace as the time series and the location series; and controlling the execution of the application according to the at-least-one rule for which the sequence classifiers in the set of sequence classifiers match with the at-least-one short-range signal trace as the time series and the location series.

12. The method according to claim 11, wherein: controlling the execution of the application includes using the time series and location series in the plurality of measured location-specific short-range signals, the application that is to be controlled is selected from a plurality of applications.

13. The method according to claim 11, wherein: signal transmitters comprise electronic devices or mobile electronic devices, and as the measured short-range signals identifiers of the transmitters of such electronic and such mobile electronic devices and their respective signal levels are read.

14. The method according to claim 13, wherein: in the set of sequence classifiers, allowed lower and upper values of each short-range signal are specified and allowed variations of the lengths in time series are specified, as well as the allowed variations of their distances from each other; and redundant short-range signal traces are removed from the short-range signal trace; and all or at least some elements in an array are transformed to a logical value.

15. The method according to claim 11, wherein: at least one rule is operated in addition to location-specific short range signals also on valuations from signals of at least one sensor in the mobile electronic device indicating i) which particular user is using the mobile electronic device or to which category of users the user using the mobile electronic device belongs, ii) how the mobile electronic device is being moved, and iii) light or sound recorded by the mobile electronic device.

16. The method according to claim 11, wherein: the set of sequence classifiers comprises at least one stencil, and wherein when determining which sequence classifiers in the set of sequence classifiers match with the at-least-one short-range signal trace as the time series and the location series, it is counted whether the holes of the stencil are non-empty.

17. The method according to claim 11, wherein controlling the execution of the application includes at least one of the following being carried out:
- starting or activating the application;
- bringing the application from the background to the foreground;
- retrieving previously stored log-in information for the application and entering it into the application; and
- starting or activating a program that measures external information and controls an external automation system, in particular a healthcare or hospital automation system, an industrial automation, or a building automation system.

18. A system comprising:
at least one processor adapted to execute a computer-readable code read from a non-transitory computer program product for controlling the execution of at least one application with a mobile electronic device in a building having a number of rooms, the application usable on the mobile electronic device or usable via the mobile electronic device, wherein the computer-readable program code, when executed by the processor, cause the processor to:

read at least one experimentally generated rule containing a set of sequence classifiers defining the relationship between at least one short-range signal trace and application control as a time series and a location series, wherein the at least one experimentally generated rule is time dependent and contains at least three time instants;

measure with the mobile electronic device, preferably by its software driver with an interface supporting location-specific short-range signal transmitter identification and optionally also signal-level measurement, a plurality of location-specific short-range signals located in the building, and to form a set of signal vectors representing short-range signals received from known signal transmitters at each time instant;

use the set of sequence classifiers of the at-least-one rule on the set of signal vectors to determine which sequence classifiers in the set of sequence classifiers match with the at-least-one short-range signal trace as the time series and the location series and control the execution of the application according to the at-least-one rule for which the sequence classifiers in the set of sequence classifiers match with the at-least-one short-range signal trace as the time series and the location series.

19. The computer according to claim 18, wherein:
the computer is a second mobile electronic device and adapted to use location-specific short-range signals measured by itself as the location-specific short-range signals of the mobile electronic device, and to control the execution of at least one application on itself; and the computer is adapted to use location-specific short-range signals measured by a remote mobile electronic device, and to control the execution of at least one application on or for the remote mobile electronic device.

* * * * *

UNITED STATES PATENT AND TRADEMARK OFFICE
CERTIFICATE OF CORRECTION

PATENT NO. : 9,710,299 B2
APPLICATION NO. : 14/342142
DATED : July 18, 2017
INVENTOR(S) : Olli Martikainen Page 1 of 1

It is certified that error appears in the above-identified patent and that said Letters Patent is hereby corrected as shown below:

On the Title Page

Item (30), in "Foreign Application Priority Data", in Column 1, Line 1, delete "11182075" and insert --11182075.9-- therefor Signed and Sealed this
Tenth Day of April, 2018

Andrei Iancu
*Director of the United States Patent and Trademark Office*